(12) United States Patent
Posamentier et al.

(10) Patent No.: US 8,149,120 B2
(45) Date of Patent: Apr. 3, 2012

(54) TEMPORARY NON-RESPONSIVE STATE FOR RFID TAGS

(75) Inventors: Joshua D. Posamentier, Oakland, CA (US); Joshua R. Smith, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 11/731,165

(22) Filed: Mar. 30, 2007

(65) Prior Publication Data

US 2008/0238680 A1 Oct. 2, 2008

(51) Int. Cl.
G08B 13/14 (2006.01)
G08B 23/00 (2006.01)
G08B 26/00 (2006.01)
H04Q 5/22 (2006.01)
B60C 23/02 (2006.01)
H01Q 1/00 (2006.01)

(52) U.S. Cl. ............ 340/572.1; 340/10.4; 340/442; 340/572.3; 340/505; 340/10.5; 343/904

(58) Field of Classification Search .............. 340/572.1, 340/10.5, 572.4, 10.1
See application file for complete search history.

(56) References Cited

U.S. PATENT DOCUMENTS 5,963,144 A * 10/1999 Kruest .................... 340/10.1
7,156,312 B2   1/2007 Becker et al.
2002/0044050 A1 * 4/2002 Derbyshire et al. ......... 340/442
2005/0200458 A1 * 9/2005 Friedman ................. 340/10.4
2006/0103534 A1 * 5/2006 Arms et al. .............. 340/572.1
2006/0170553 A1 * 8/2006 Bierach ................... 340/572.4
2006/0220795 A1 * 10/2006 Limbachiya ............. 340/10.5
2006/0289641 A1 * 12/2006 Roesner ................... 235/435
2007/0046369 A1 * 3/2007 Schober et al. .............. 330/7
2007/0115137 A1 * 5/2007 Lyon et al. ............. 340/825.49
2007/0126556 A1 * 6/2007 Subramanian et al. ..... 340/10.4

FOREIGN PATENT DOCUMENTS

| EP | 0553905 A1 | 8/1993 |
| EP | 1172755 A1 | 1/2002 |
| KR | 10-0234809 B1 | 12/1999 |
| KR | 10-2006-0112976 A | 11/2006 |

OTHER PUBLICATIONS

International Search Report/Written Opinion for Patent Application No. PCT/US2008/058734, mailed Jul. 31, 2008, 10 Pages.
First Office Action Mailed May 10, 2010, European Patent Application No. 08744664.7.

* cited by examiner

*Primary Examiner* — Daniel Wu
*Assistant Examiner* — Pameshanand Mahase
(74) *Attorney, Agent, or Firm* — Kacvinsky Daisak, PLLC

(57) ABSTRACT

A radio frequency identification (RFID) tag may have a non-responsive mode, triggered by a command from an RFID reader, that temporarily prevents the RFID tag from responding to a query from any RFID reader for a period of time. In some embodiments this non-responsive mode may automatically end after a certain period of time without further action by the RFID reader. In other embodiments this non-responsive mode may end when directed to by another command addressed specifically to the RFID tag.

18 Claims, 5 Drawing Sheets

TEMPORARY NON-RESPONSIVE STATE FOR RFID TAGS

BACKGROUND

Radio frequency identification (RFID) technology is increasingly used for inventory purposes. Because it is sometimes necessary for an RFID reader to identify a large number of RFID-tagged objects in a small area, the large number of overlapping responses can cause errors in the inventory process, especially with tag-talks-first technology in which every energized tag repeatedly transmits its response as long as it is energized. To address this problem, flags have been placed in some types of RFID tags that, when set with a command from the RFID reader, prevent that tag from responding to further queries. A blanket reset command can then reset these flags for all the tags in the RFID reader's range. Turning these flags on and off can reduce the number of concurrently responding tags to a manageable level, and thus make the inventory process more accurate and manageable. However, some environments will pass the tagged objects past multiple RFID readers. This can result in the flags being set and reset in numerous different ways, which can ultimately cause a lot of redundant reads and inferior performance.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
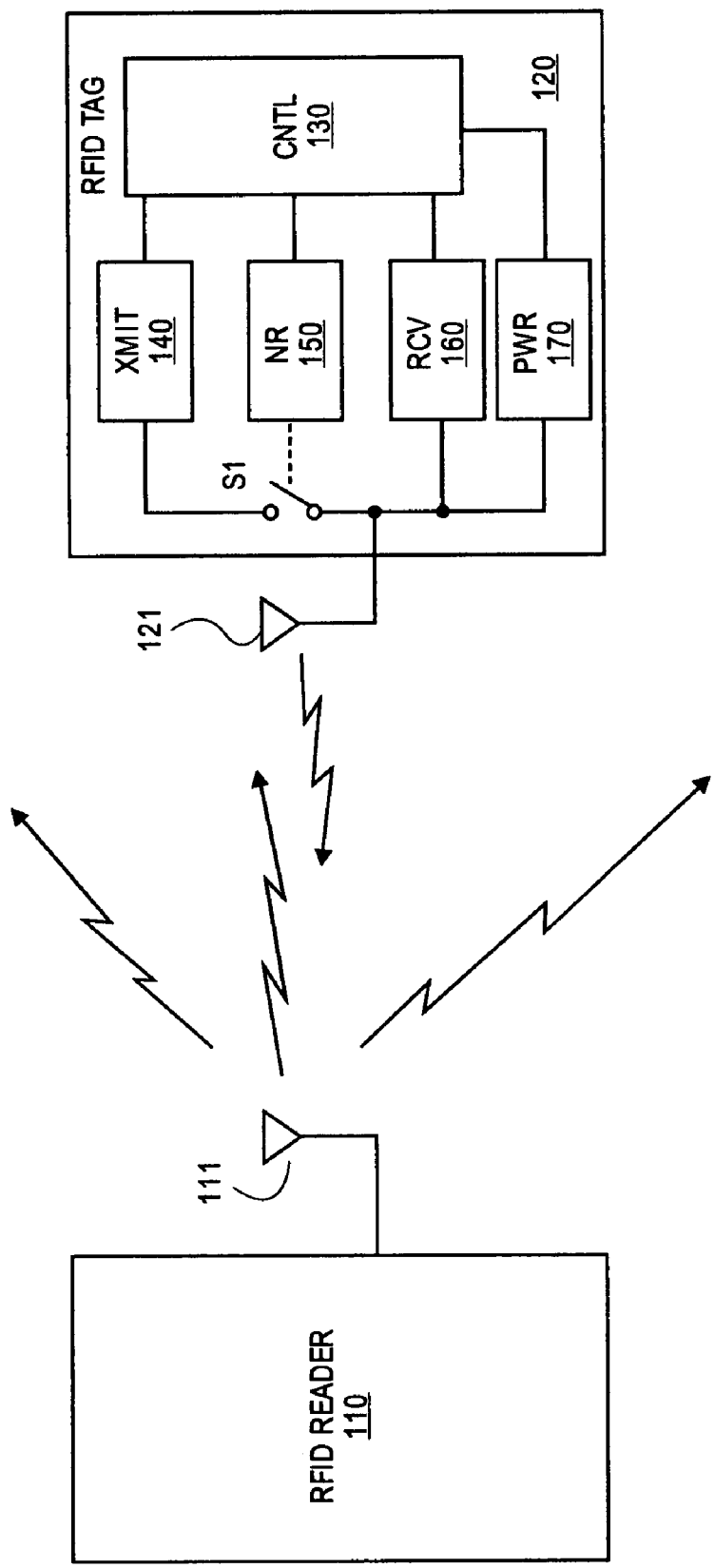
FIG. 1 shows and RFID network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" indicates that two or more elements are in direct physical or electrical contact with each other. "Coupled" indicates that two or more elements cooperate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be physically in motion while it is communicating. A wireless command is a command that is transmitted and/or received through a wireless medium and one or more antennas.

Within the context of this document, an RFID tag (sometimes referred to as an RFID transponder) is defined as comprising an RFID antenna (to receive an incoming wireless signal that serves to activate the RFID tag, and to transmit a wireless response in the form of a modulated radio frequency signal), and an RFID tag circuit (which may include circuitry to store an identification code for the RFID tag, circuitry to transmit that code through the antenna, and in some embodiments a power circuit to collect received energy from the incoming radio frequency signal and use some of that energy to power the operations of the RFID tag circuit). The RFID tag circuit and/or the RFID antenna may be in a standalone package, or may be incorporated in a package with other circuitry (e.g., on a printed circuit board or in a semiconductor die containing other circuitry). As is known in the field of RFID technology, "transmitting" a signal from an RFID tag may include either: 1) providing sufficient power to the antenna to generate a signal that radiates out from the antenna, or 2) reflecting a modulated version of the received signal. Within the context of this document, an RFID reader is a device that wirelessly transmits a signal to the RFID tag to cause the RFID tag to wirelessly transmit the aforementioned response, which may be received by the RFID reader to identify the RFID tag. A 'passive RFID tag' is an RFID tag that obtains its operating power by harvesting energy from the radio frequency signal received through its antenna, while an 'active RFID tag' is an RFID tag that obtains its operating power by being connected to a battery or other physically tangible power source (e.g., a power supply).

In some embodiments of the invention, an RFID tag may contain circuitry to temporarily stop the tag from responding to further queries from an RFID reader, if the tag receives a command from an RFID reader directing it to do so. This period of non-response may end in various ways, such as: 1) the expiration of an internal timer, 2) based on monitoring queries still being made by the RFID reader, or 3) receipt of a command specifically addressed to the RFID tag, directing it to exit the non-responsive mode.

FIG. 1 shows an RFID network, according to an embodiment of the invention. In the illustrated embodiment, an RFID reader 110 may transmit wireless signals through its antenna 111 that are received by various RFID tags that are within range. For simplicity of explanation, only one RFID tag 120 is shown, although many such tags may be receiving signals from the RFID reader 110 at the same time. Tag 120 may receive the signal through its antenna 121. In a passive RFID tag, power circuit 170 may harvest some of the electrical energy from the received signal, and accumulate that electrical energy until it is sufficient to allow the tag 120 to operate under overall control of control circuit 130. Once the tag is operating, transmit circuitry 140 may transmit the tag's identification information back to the reader 110 (assuming switch S1 is closed). Receive circuit 160 may demodulate any subsequent received signal to determine what information the RFID reader 110 is transmitting to the RFID tag 120.

One type of such information may be a command directing the RFID tag to perform a specific action. One specific type of command (referred to herein as an NR command) may direct the RFID tag to enter a 'non-responsive' mode (NR mode), a mode in which the RFID tag does not transmit, regardless of whether it would normally transmit in response to the received signal. However, in some embodiments the RFID tag may perform various internal actions in response to received signals even though it does not transmit. While in the NR mode, NR circuit 150 may effectively prevent any transmissions from the RFID tag. The illustrated embodiment shows the NR circuit 150 controlling a switch that can disconnect the transmit circuit 140 from the antenna 121, but any feasible circuitry may be used to disable transmissions during the NR mode.

While in the NR mode, RFID tag 120 may still receive, demodulate, and interpret signals received from RFID reader 110, and/or from other RFID readers. Depending on the content of these received signals, RFID tag 120 may take various internal actions, to be described later.

Figure 2:
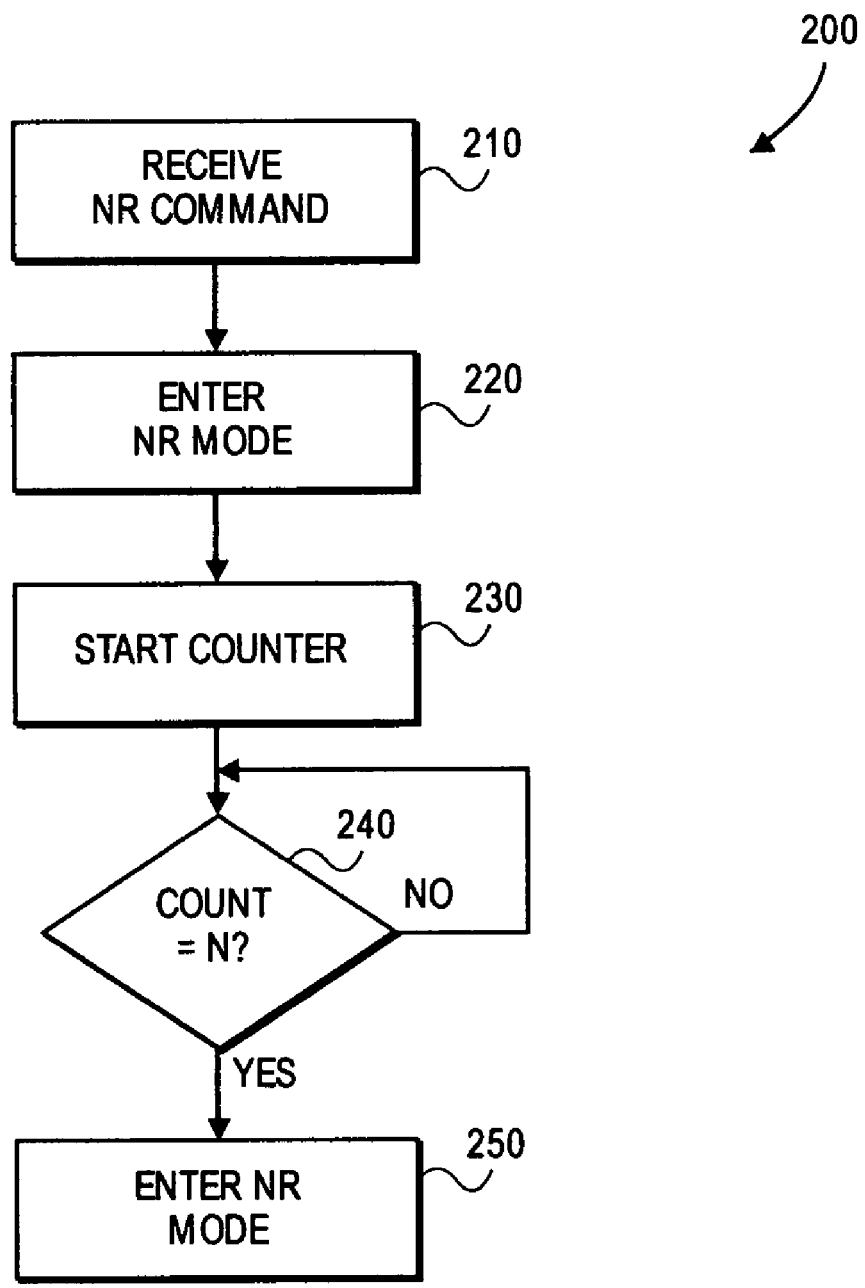
FIG. 2 shows a flow diagram of a first method of entering and exiting a non-responsive mode, according to an embodiment of the invention.

FIG. 2 shows a flow diagram of a first method of entering and exiting a non-responsive mode, according to an embodiment of the invention. In the illustrated flow diagram 200, at 210 an RFID tag may receive a command from an RFID reader, directing the RFID tag to enter the NR mode, which it may do at 220. In this embodiment, the duration of the NR mode is determined through a counter within the RFID tag. Counting up to a specified value N is shown, but other embodiments may count down to zero, or use some other counting technique. In some embodiments, the number of counter increments, and therefore the duration of the NR mode, may be pre-set in the RFID tag, but in other embodiments the duration may be indicated by a value in the command from the RFID reader, which is received and stored in the counter circuitry. Regardless of how the counter is implemented, when the count expires at 240 the RFID tag exits the NR mode at 250 and may begin transmitting again when prompted to through normal operations.

When using this counter technique, the counter may use the same clock source that is already used to operate other digital circuitry in the RFID tag. If volatile logic is used in the counter circuitry in a passive RFID tag, the counter may lose its contents whenever the RFID tag loses its energizing signal, and may have to be reset to a default value whenever the tag is re-energized again. Alternately, the RFID tag may automatically re-energize in an operational mode rather than the NR mode.

Figure 3:
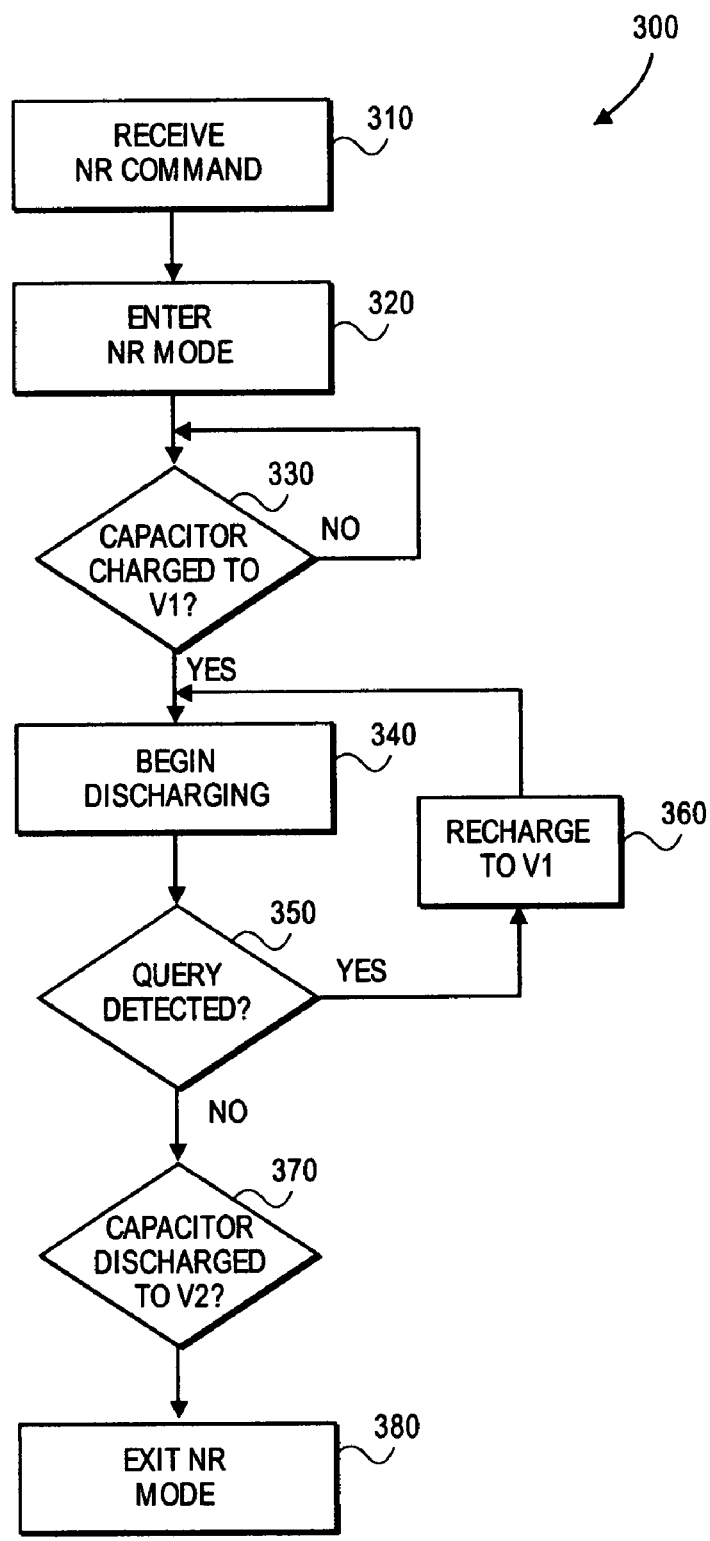
FIG. 3 shows a flow diagram of a second method of entering and exiting a non-responsive mode, according to an embodiment of the invention.

FIG. 3 shows a flow diagram of a second method of entering and exiting a non-responsive mode, according to an embodiment of the invention. In this technique, the duration of the NR mode is determined by the amount of time it takes a capacitor to discharge from a higher voltage V1 to a lower voltage V2. In the illustrated embodiment of flow diagram 300, at 310 the RFID tag receives a command from an RFID reader to enter the NR mode, which the RFID tag does at 320. In some embodiments, the command may include a value that indicates how long the NR period is to last. This may be done in various ways, such as but not limited to 1) indicating a desired value for voltage V1, 2) indicating a desired value for voltage V2, 3) indicating both V1 and V2, 4) indicating how fast the capacitor is to discharge by adjusting the load that it discharges through, 5) etc.

If the timing capacitor has already charged to V1, as determined at 330, it may immediately begin discharging at 340. However, in some operations the capacitor may not have fully charged yet. This may occur for various reasons, such as but not limited to: 1) the incoming signal from the RFID reader was marginally weak, resulting in a long charge-up time for the capacitor, 2) the RFID tag received the command very soon after the RFID tag's power circuit accumulated sufficient charge for operation, 3) the NR command specified a high value for V1, 4) etc. In such cases, discharging may have to wait until full charging is achieved at 330. However, in some embodiments V1 will always be less than the operational voltage for the RFID tag, and the capacitor will always be fully charged by the time the NR command is received and recognized.

The timing capacitor begins discharging at 340. If the discharging process is not interrupted, the voltage across the capacitor may reach V2 at 370. This event can trigger circuitry that causes the RFID tag to exit the NR mode at 380, leaving it free to transmit again under the proper circumstances. One advantage to using a discharging capacitor to measure time is that the capacitor may continue to discharge, at approximately the same rate, even if the RFID tag loses its energizing signal and therefore ceases to operate for awhile. When the RFID tag again receives an energizing signal, the NR mode may still be in effect. This could happen if, for instance, movement of a pallet of tagged items past an RFID reader causes the tag to be temporarily blocked so that it can't receive the signal from the reader. When the tag is unblocked, it will still refrain from responding to the RFID reader. This could also be useful in environments using multiple RFID readers, in which the RFID tag moves out of range of the first RFID reader before moving into the range of a second RFID reader.

In some embodiments, the initial duration indicated for the NR mode may be extended during the NR mode. For example, it may be desirable to keep the RFID tag in the NR mode as long as the RFID reader is still sending out queries to other RFID tags in the vicinity. In this instance, detection of a query at 350 can cause the RFID tag to recharge its timing capacitor to V1 (or alternately to some intermediate voltage) at 360. Thus the NR period may continue until the RFID reader is no longer trying to communicate with other RFID tags. The term 'query', as used here, may be defined broadly or narrowly to mean any type of communication from the RFID reader that is intended to prolong the NR period for the RFID tag. In some embodiments it may be limited to certain types of communications, while in other embodiments it may include a simple energizing signal, whether or not it is modulated. In some embodiments, a specific command addressed to this RFID tag may extend the NR period by directing this RFID tag to recharge to a certain level.

The technique of extending the original NR period may also be applied to the counter circuitry described in FIG. 2, except that instead of recharging a capacitor, the counter would be reset to a particular value. In other embodiments, for the techniques described in either FIG. 2 or FIG. 3, the original NR duration set at the beginning of the NR mode may remain unchangeable while the RFID tag remains energized, i.e., the duration will not be affected by any commands and/or queries received while in the NR mode.

Figure 4:
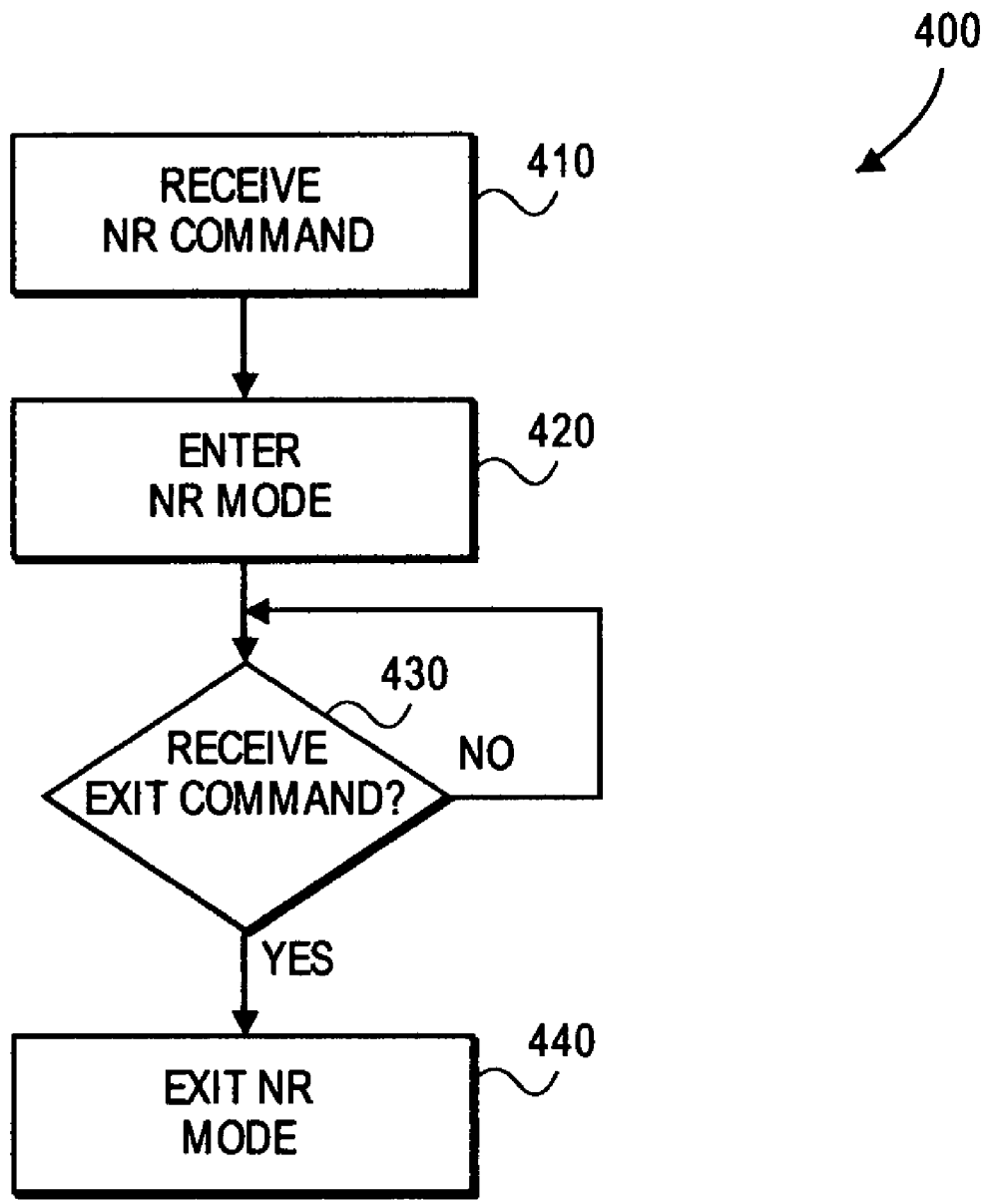
FIG. 4 shows a flow diagram of a third method of entering and exiting a non-responsive mode, according to an embodiment of the invention.

FIG. 4 shows a flow diagram of a third method of entering and exiting a non-responsive mode, according to an embodiment of the invention. In this method, exiting the NR mode may be triggered by receipt of a command addressed specifically to this particular RFID tag. Referring to flow diagram 400, at 410 a command may be received that directs this particular RFID tag to enter the NR mode, which it does at 420. The RFID tag may remain in the NR mode until the RFID tag receives a command from an RFID reader at 430, the command being specifically addressed to the RFID tag and directing the RFID tag to exit the NR mode at 440, whereupon it may begin responding to queries again. To prevent the RFID tag from permanently locking up if it doesn't receive the exit command, powering up from a powered-off state (for example, moving into the activation range of an RFID reader) may reset the RFID tag to an operational mode even if it was in the NR mode when it lost operating power.

FIGS. 2-4 describe three separate techniques for exiting the NR mode. However, some embodiments may incorporate more than one of these techniques, and/or may combine one or more of these techniques with other techniques not described here.

Figure 5:
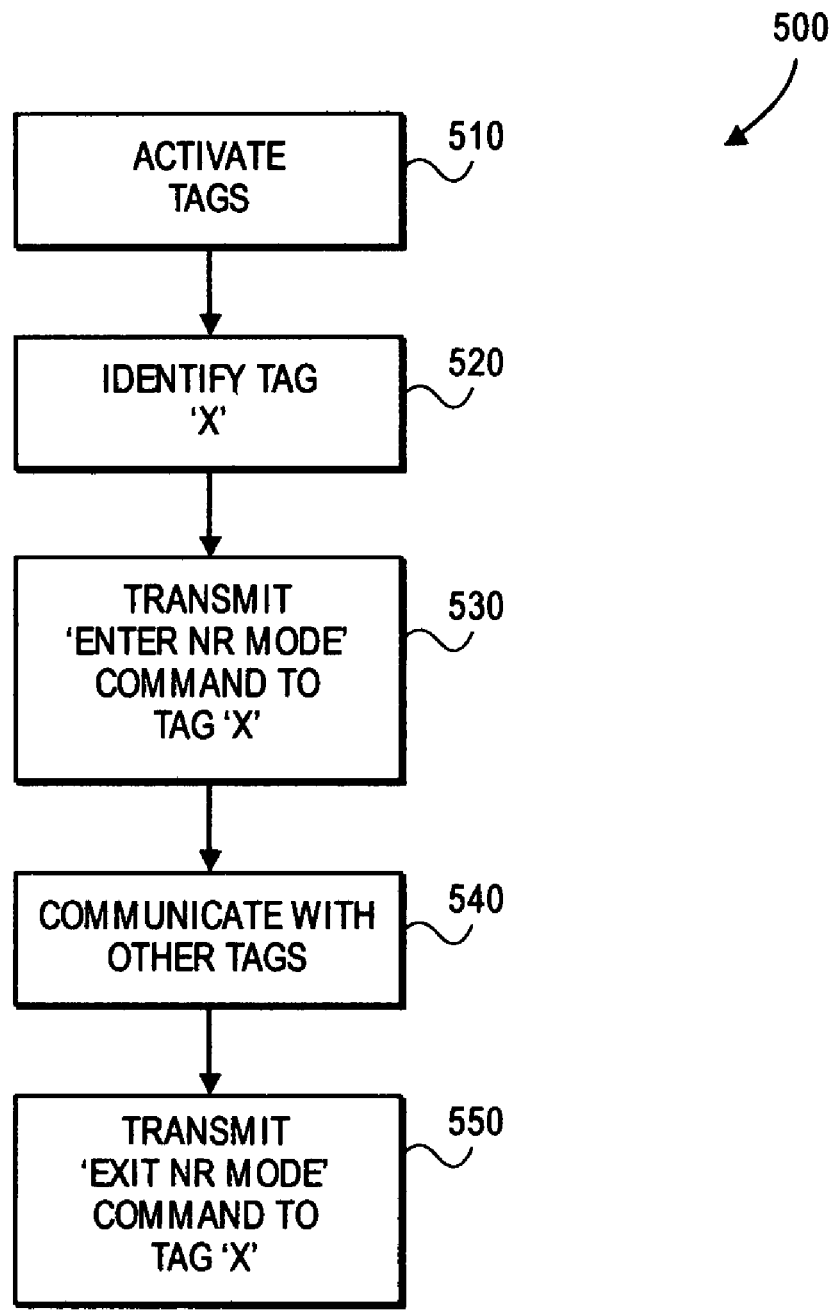
FIG. 5 shows a flow diagram of a method performed by an RFID reader, according to an embodiment of the invention.

FIG. 5 shows a flow diagram of a method performed by an RFID reader, according to an embodiment of the invention. In flow diagram 500, at 510 the RFID reader may transmit an activating signal to the RFID tags within range of the RFID reader. In some embodiments, an activating signal may simply be a wireless carrier wave of the correct frequency and of sufficient strength to energize the nearby RFID tags. In other embodiments, an activating signal may require more, such as but not limited to a carrier wave that has been modulated to cause only one or more specific tags to respond. Within the responses received from the various RFID tags thus activated, the RFID reader may receive a response identifying a particular tag 'X' at 520. At 530 the RFID reader may transmit an NR command addressed to tag X, directing tag X to enter an NR mode, so that it will not respond to the reader any more until the NR mode is exited. The RFID reader may or may not conduct other communications with tag X before transmitting the NR command.

After directing tag X to not respond, at 540 the RFID tag may continue to communicate with other tags, without tag X interfering with those communications. In some operations, tag X will subsequently exit from the NR mode under its own control. In the illustrated operation, the RFID reader may transmit a command addressed to tag X at 550 directing tag X to exit the NR mode.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
a radio frequency identification (RFID) tag containing circuitry to:
receive a first wireless command directed to the RFID tag from an RFID reader;
enter, resultant to said receiving the first wireless command, a non-responsive mode during which the RFID tag performs one or more internal actions in response to one or more received signals while remaining in the non-responsive mode, but does not transmit responses to any RFID reader and transmissions are disabled by disconnecting the circuitry from an antenna, wherein an intended duration of the non-responsive mode can be extended; and
exit the non-responsive mode based on a timing circuit within the RFID tag.

2. The apparatus of claim 1, wherein the intended duration of the non-responsive mode is determined by contents of the first wireless command.

3. The apparatus of claim 1, wherein:
the timing circuit comprises a capacitor;
the capacitor is to be charged to a first voltage level resultant to receiving the first wireless command; and
the non-responsive mode is to end resultant to the capacitor discharging to a second voltage level.

4. The apparatus of claim 3, wherein:
the RFID tag is a passive RFID tag; and
said discharging is to continue at approximately a same rate when the passive RFID tag is not receiving an energizing signal from any RFID reader.

5. The apparatus of claim 3, wherein the capacitor is to be recharged resultant to the RFID tag detecting a query while in the non-responsive mode.

6. The apparatus of claim 3, wherein the first voltage level is to be indicated in the first wireless command.

7. The apparatus of claim 3, wherein a rate of discharge of the capacitor is to be indicated in the first wireless command.

8. The apparatus of claim 1, wherein the timing circuit comprises a counter; and
the non-responsive mode is to end when the counter reaches a certain value.

9. The apparatus of claim 8, wherein the timing circuit may be reset to a particular value by receipt of a second wireless command during the non-responsive mode.

10. An apparatus, comprising
a radio frequency identification (RFID) tag, containing circuitry to:
receive a particular wireless command directed to the RFID tag from a particular RFID reader;
enter, resultant to said receiving the particular command, a non-responsive mode during which the RFID tag performs one or more internal actions in response to one or more received signals while remaining in the non-responsive mode, does not transmit responses to any RFID reader and transmissions are disabled by disconnecting the circuitry from an antenna, wherein an intended duration of the non-responsive mode can be extended; and
exit the non-responsive mode resultant to the particular RFID tag receiving a command addressed to the RFID tag directing the RFID tag to exit the non-responsive mode.

11. A method, comprising:
  receiving a wireless command from a radio frequency identification (RFID) reader to enter a non-responsive mode of operation,
  entering the non-responsive mode resultant to receiving the command by transmissions by disconnecting from an antenna; and
  performing one or more internal actions in response to one or more received signals while remaining in the non-responsive mode, wherein an intended duration of the non-responsive mode can be extended; and
  returning to a responsive mode resultant to an internal event not based on any wireless command received while in the non-responsive mode.

12. The method of claim 11, wherein the internal event comprises expiration of a time period.

13. The method of claim 12, wherein the expiration of the time period is determined by a capacitor discharging to a particular voltage level.

14. The method of claim 12, wherein the expiration of the time period is determined by reaching a certain value in a counter.

15. A method, comprising:
  receiving, by a radio frequency identification (RFID) tag, a first wireless command from an RFID reader to enter a non-responsive mode of operation,
  entering the non-responsive mode as a result of receiving the first wireless command by disabling transmissions by disconnecting from an antenna, wherein an intended duration of the non-responsive mode can be extended;
  performing one or more internal actions in response to one or more received signals while remaining in the non-responsive mode;
  receiving a second wireless command addressed to the RFID tag, the second wireless command directing the RFID tag to enter a responsive mode of operation; and
  exiting the non-responsive mode resultant to receiving the second wireless command.

16. An article comprising
  a storage medium that contains instructions, which when executed by one or more processors result in performing operations comprising:
    transmitting an enabling signal to multiple radio frequency identification (RFID) tags;
    receiving a response from a particular RFID tag; and
    transmitting a first command addressed to the particular RFID tag and directing the particular RFID tag to enter a non-responsive mode by disabling transmissions by disconnecting from an antenna, wherein one or more internal actions are performed by the particular RFID tag in response to one or more received signals while remaining in the non-responsive mode, wherein an intended duration of the non-responsive mode can be extended.

17. The article of claim 16, wherein the operation of transmitting the first command comprises transmitting an indicator of an intended duration of the non-responsive mode.

18. The article of claim 16, wherein the operations further comprise transmitting a second command addressed to the particular RFID tag and directing the particular RFID tag to exit the non-responsive mode.

* * * * *